(12) United States Patent
Zetterlund et al.

(10) Patent No.: US 9,948,889 B2
(45) Date of Patent: Apr. 17, 2018

(54) PRIORITY OF UPLINK STREAMS IN VIDEO SWITCHING

(71) Applicant: TELEFONAKTIEBOLAGET LM ERICSSON (PUBL), Stockholm (SE)

(72) Inventors: Jerker Mattias Zetterlund, Bromma (SE); Bo Burman, Upplands Väsby (SE); Patrik Sandgren, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/323,913

(22) PCT Filed: Jul. 4, 2014

(86) PCT No.: PCT/SE2014/050863
§ 371 (c)(1),
(2) Date: Jan. 4, 2017

(87) PCT Pub. No.: WO2016/003344
PCT Pub. Date: Jan. 7, 2016

(65) Prior Publication Data
US 2017/0155870 A1   Jun. 1, 2017

(51) Int. Cl.
*H04N 7/14* (2006.01)
*H04L 29/06* (2006.01)
*H04N 7/15* (2006.01)

(52) U.S. Cl.
CPC ............ *H04N 7/147* (2013.01); *H04L 65/80* (2013.01); *H04N 7/15* (2013.01)

(58) Field of Classification Search
CPC ........... H04N 7/147; H04N 7/15; H04L 65/80
See application file for complete search history.

(56) References Cited

U.S. PATENT DOCUMENTS

| 6,453,336 | B1  | 9/2002 | Beyda et al. |
| 7,554,571 | B1* | 6/2009 | Beck ............... H04N 7/147 348/14.07 |

(Continued)

FOREIGN PATENT DOCUMENTS

| WO | 2008082375 A2 | 7/2008 |
| WO | 2012072276 A1 | 6/2012 |
| WO | 2012099589 A1 | 7/2012 |

OTHER PUBLICATIONS

International Search Report and Written Opinion dated Apr. 27, 2015, in International Application No. PCT/SE2014/050863, 11 pages.

*Primary Examiner* — Stella Woo
(74) *Attorney, Agent, or Firm* — Rothwell, Figg, Ernst & Manbeck, P.C.

(57) ABSTRACT

A method relating to a video conference connecting a first terminal to a plurality of second terminals via a switching server is disclosed. The switching server receives a plurality of uplink video streams from the first terminal via a single transport path, and the switching server sends a downlink video stream based on the uplink video streams to each of the second terminals. The method involves the steps of collecting information relating to the use of each of the second terminals and determining an order between the uplink video streams based on the information. The method further involves the steps of generating instructions for the first terminal to adjust the plurality of uplink video streams based on the order, and informing the first terminal of the instructions. A switching server and a first terminal involved in the method are also disclosed.

20 Claims, 5 Drawing Sheets

(56) References Cited

U.S. PATENT DOCUMENTS

| | | | |
|---|---|---|---|
| 2005/0099492 A1* | 5/2005 | Orr | H04L 12/1827 348/14.08 |
| 2008/0068446 A1* | 3/2008 | Barkley | H04N 7/147 348/14.07 |
| 2009/0210491 A1 | 8/2009 | Thakkar et al. | |
| 2010/0002067 A1* | 1/2010 | Ozawa | H04L 29/06027 348/14.01 |
| 2010/0149301 A1* | 6/2010 | Lee | H04L 12/1818 348/14.08 |
| 2011/0022705 A1* | 1/2011 | Yellamraju | H04L 65/1069 709/224 |
| 2011/0292165 A1* | 12/2011 | Berger | H04N 7/152 348/14.12 |
| 2011/0310216 A1* | 12/2011 | Lee | H04N 7/15 348/14.08 |
| 2013/0208075 A1 | 8/2013 | Lu et al. | |
| 2014/0003450 A1* | 1/2014 | Bentley | H04N 7/15 370/468 |
| 2015/0201161 A1* | 7/2015 | Lachapelle | H04N 7/15 348/14.07 |
| 2016/0021149 A1* | 1/2016 | Maistri | H04L 65/403 348/14.08 |

\* cited by examiner

PRIORITY OF UPLINK STREAMS IN VIDEO SWITCHING

CROSS REFERENCE TO RELATED APPLICATION(S)

This application is a 35 U.S.C. § 371 National Phase Entry Application from PCT/SE2014/050863, filed Jul. 4, 2014, designating the United States, the disclosure of which is incorporated herein in its entirety by reference.

TECHNICAL FIELD

This disclosure generally relates to video conferences and in particular to video switching in such conferences. It further relates to the control of uplink video streams from terminals used in the conference to a video switching server.

BACKGROUND

In video conference solutions, people at two or more locations can communicate by simultaneous two-way video and audio transmissions. There are different systems through which the participants interact. For example, it can be dedicated systems having all the required components. These systems are typically installed in meeting rooms and auditoriums. There are also desktop systems coupled to or integrated with normal personal computers.

A core technology used in a videoconferencing system is digital compression of audio and video streams in real time. The hardware or software performing the compression is commonly called a codec (coder/decoder). The resulting digital stream is transmitted through a digital network. Other technologies typically required for a videoconferencing system are a video camera or webcam for providing a video input, and a display unit in the form of a computer monitor, television or projector for providing a video output. Microphones are commonly used for audio input and loudspeakers are typically used for audio output. The microphones and loudspeakers are sometimes integrated with the display unit. A data processing unit, e.g. a computer, ties together the components, implements the codec, and maintains a data linkage with other video conference systems via a digital network.

In video switching solutions each participant typically sends several uplink video streams that differ in resolution or other quality aspects. A video switching server selects among the streams received from the main speaker and selects an appropriate stream to send to each receiver in the downlink direction. The downlink streams are selected based on different factors, such as the resolution of the receiver's screen, the bandwidth available in the downlink direction, and the packet loss rate. This means that some of the streams sent by the speaker may be used by many receivers and some streams may not be used by any receivers.

Throughout this specification, a transport path is understood to be a channel suitable for sending video stream data. Thus, an uplink video stream from a sender in a video conference to a video switching server may be sent via a transport path. Similarly, a downlink video stream from a video switching server to a receiver in a video conference may be sent via a transport path. A transport path typically spans over several access technologies, for example radio, as well as some backbone technology, for example fiber.

A participant may experience changes in the transport path, such as a change in the available bandwidth or change in the packet loss rate. The changes in the uplink transport path can typically be due to changes in radio conditions, for example in WiFi and cellular technologies, such as Long-Term Evolution (LTE). The participant can typically adjust the data sent uplink in order to maximize the video quality based on the available bandwidth. The different uplink streams may use separate and independent transport paths, but the more common case is that they share one single, or at least only a few different, transport paths. Thus, a change in the transport path typically impacts multiple uplink streams simultaneously.

The sending participant can typically choose how to distribute transport path resources to the uplink streams. This choice can include everything from impacting all streams sharing the same transport path proportionally to selecting one stream at a time in some priority order to be adjusted before impacting other streams. In the latter case, if the available bandwidth decreases, and if stream bitrate cannot be reduced, one or more of the uplink streams can be stopped. The video switching server can then instead provide the receivers of the stopped streams with another stream of lower resolution, which will decrease the video quality for the affected users. If the available bandwidth increases, a previously stopped uplink stream can be started again.

If the stream bitrate can be reduced in the encoding process, the sender could decide to do that for one or more streams at the event of decreased available uplink bandwidth, meaning that quality is reduced for those streams in a way that depends on the chosen encoding process. Video bitrate can be reduced by decreasing the resolution, frame rate or SNR, and this would of course decrease the quality for the affected receivers.

SUMMARY

In existing video switching technologies, a sending participant in a video conference does not know the importance of the various uplink video streams that he sends. Thus, when the transmission properties of a transport path changes, there is no guidance for which video stream to modify to optimize the general user experience for the participants, and in particular to ensure that important participants, for example a main speaker, are not left at a disadvantage.

It is therefore an object to address some of the problems outlined above, and to provide a solution for prioritizing uplink video streams in a video conference. This object and others are achieved by the methods, the switching servers, and the first terminal according to the independent claims, and by the embodiments according to the dependent claims.

In accordance with a first aspect of the present invention, a method for being performed in a switching server for controlling uplink video streams in a video conference connecting a first terminal to a plurality of second terminals via the switching server is provided. The switching server receives a plurality of uplink video streams from the first terminal via a single transport path, and the switching server sends a downlink video stream based on an uplink video stream of the plurality of uplink video streams to each of the second terminals. The method comprises: collecting information relating to the use of each of the second terminals, and determining an order between the plurality of uplink video streams based on the information. The method further comprises: generating instructions for the first terminal to adjust the plurality of uplink video streams based on the order, and informing the first terminal of the instructions.

In accordance with a second aspect of the present invention, a method for being performed in a first terminal for controlling a plurality of uplink video streams in a video conference connecting the first terminal to a plurality of second terminals via a switching server is provided. The first terminal sends a plurality of uplink video streams to the switching server via a single transport path and the method comprises: receiving instructions from the switching server to adjust the plurality of uplink video streams based on an order between the plurality of uplink video streams derived from information relating to the use of each of the second terminals collected by the switching server. The method further comprises: adjusting the plurality of uplink video streams in accordance with the instructions.

In accordance with a third aspect of the present invention, a switching server for controlling uplink video streams in a video conference connecting a first terminal to a plurality of second terminals via the switching server is provided. The switching server is configured for receiving a plurality of uplink video streams from the first terminal via a single transport path and for sending a downlink video stream based on an uplink video stream of the plurality of uplink video streams to each of the second terminals. The switching server is configured to: collect information relating to the use of each of the second terminals, and determine an order between the plurality of uplink video streams based on the information. The switching server is further configured to: generate instructions for the first terminal to adjust the plurality of uplink video streams based on the order, and inform the first terminal of the instructions.

In accordance with a fourth aspect of the present invention, a first terminal for controlling a plurality of uplink video streams in a video conference connecting the first terminal to a plurality of second terminals via a switching server is provided. The first terminal is configured to: send the plurality of uplink video streams to the switching server via a single transport path, and receive instructions from the switching server to adjust the plurality of uplink video streams based on an order between the plurality of uplink video streams derived from information relating to the use of each of the second terminals collected by the switching server. The first terminal is further configured to: adjust the plurality of uplink video streams in accordance with the instructions.

In the case of several uplink streams sharing the same transport path resources, it is thus proposed a technique that allows the video switching server to inform the participants of the video conference about which stream to send and to stop, resume, reduce, or increase bitrate for in case of changed available uplink bandwidth. Furthermore, it is also proposed a technique in which the video switching server decides the importance of all uplink streams based on the number of receivers of each stream, the receivers' subscriptions, the configurations related to the specific video conference, and/or which participants are the most active participants in the conference. This listing is not exhaustive and other criteria may be defined, which may be used alone or in combination with the listed criteria.

An advantage of at least one embodiment is that the most important video streams are prioritized, which gives a better conference experience for the participants. For example, if the majority of the participants in a conference are receiving a particular stream resolution, then it is important to send and not to stop or otherwise reduce the quality of this stream, since the degraded video quality impacts many users. Another example is if many persons attend the video conference together in a meeting room, then the resolution received to this room may be the most important and should not be degraded.

DETAILED DESCRIPTION

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist. Embodiments are described in a non-limiting general context and in relation to an example scenario involving a video switching server in a video conference.

According to embodiments of the present invention, the video switching server collects information about the importance of the different receivers in the conference and decides of a resulting relative importance between the streams. The video switching server informs the senders or terminals about the priorities the uplink streams. The applied technology is not to be understood as limited to informing a single sender or terminal. In an application of the proposed technology, the switching may inform all senders or terminals of their respective priorities.

Figure 1:
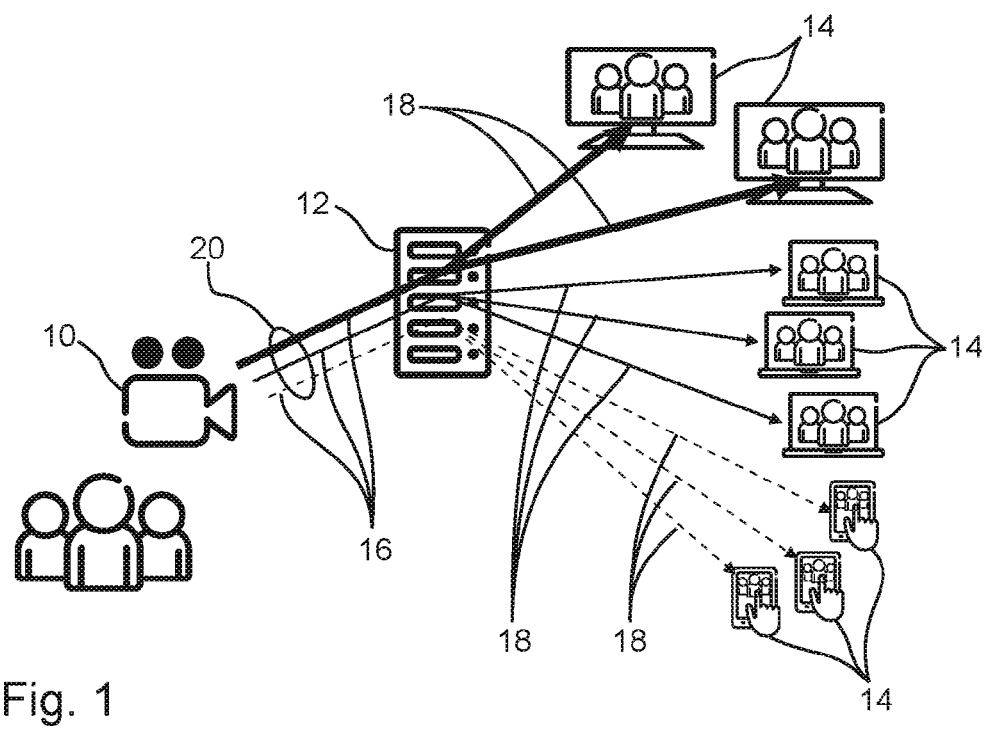
FIG. 1 is a schematic illustration of an example of a prior art video conference with uplink video streams switched to different receivers.

FIG. 1 is a schematic illustration of an existing video conference technique in which uplink video streams 16 are switched to different receivers 14. Three different uplink video streams 16 are sent from a terminal 10 to a video switching server 12. All the uplink video streams 16 are sent via a single transport path 20. The three uplink video streams 16 are transmitted at different bitrates, which is represented by the different widths of the arrows. The switching server 12 generates downlink video streams 18 from the uplink video streams 16 and sends the downlink video streams 18 to the different receiving terminals 14. Typically, the downlink video streams 18 are unmodified uplink video streams 16. In FIG. 1, downlink video streams 18 originate from an uplink video stream 16 having the same width.

In one embodiment (A) of the present invention, the server may, based on the priorities of the uplink streams, indicate to a participant which streams to send and when it needs to stop, resume, reduce, or increase bitrate for a specific stream.

In an alternative embodiment (B), the server may inform the participants of the actual priorities at start of the conference, and let each participant decide which streams to send and when to stop, resume, reduce, or increase bitrate and for which stream. The server may also inform the participants of the actual priorities also during the conference in case the priorities change.

The switching server may inform a participant which stream to send, decrease or increase at the actual time only when the participant needs to take action, which is a signaling efficient solution. In this case the server must be aware of when it is time for decrease/increase of the uplink streams from a participant. This may be done by monitoring packet loss and/or media path delays. The indication of which stream to decrease/increase may be conveyed via Real Time Control Protocol/Temporary Maximum Media Stream Bit Rate Request. This solution keeps the resource impact in the video switching server and clients can rely on features which are supported in known technologies.

An alternative solution is that the server may continuously keep the participants up to date about their uplink stream priorities. Such signaling may be conveyed via Session Description Protocol or Real Time Control Protocol extensions. This way each participant at any point in time knows which stream to affect or restore if needed. The drawbacks of continuously informing are a larger client resource impact and potentially a heavier signaling load if changes occur frequently during the conference.

The priority information may have a major impact on the sent streams and will thus impact the user experience negatively if lost. However, in the embodiments, it may be possible to continue the conference even if priority information is lost, although with reduced quality. Thus, basic loss protection may be used for the priority information.

There are a number of possible criteria for the video switching server that may be used as input for the uplink streams. One such criteria (I) is the number of receivers of each stream. The more receivers of a stream, the higher a priority it is given. The number of receivers may vary during the duration of the conference as participants join and leave the conference.

Another criteria (II) may be a receivers' subscriptions. Streams received by users with a premium subscription may be given higher priority than streams received by users with a non-premium subscription. The video switching server may receive this information from a subscriber database.

Other criteria may be associated with configurations related to a specific video conference. For example (IIIa), when setting up the conference, it may be possible for a moderator to configure if any of the receivers or sites is more important than the other. This could be particularly useful if one of the receivers is a business customer which should be given the best conference experience. In another example (IIIb), each participant in the conference may be able to enter how many persons are viewing the screen on the site, and this information is sent to the video switching server. The server collects the information and gives higher priority to streams viewed by more people. In another example, this indication is may be automated, for example by using face recognition technology locally in the sending endpoint. Face recognition technology may be available centrally in the video switching server, which then have to decode and analyze at least some of the received video. Then it is not necessary to transmit information of the number of persons viewing the screen to the video switching server.

Another criteria (IV) may be how active the participants are in the conference. Participants which are more active, e.g. considered main speaker by the video switching server, are given higher priority in their received streams as they can be assumed to be more engaged in the conference. The activity level of the participants can be summarized or integrated over some appropriate time, for example over the past 15 minutes.

Figure 2:
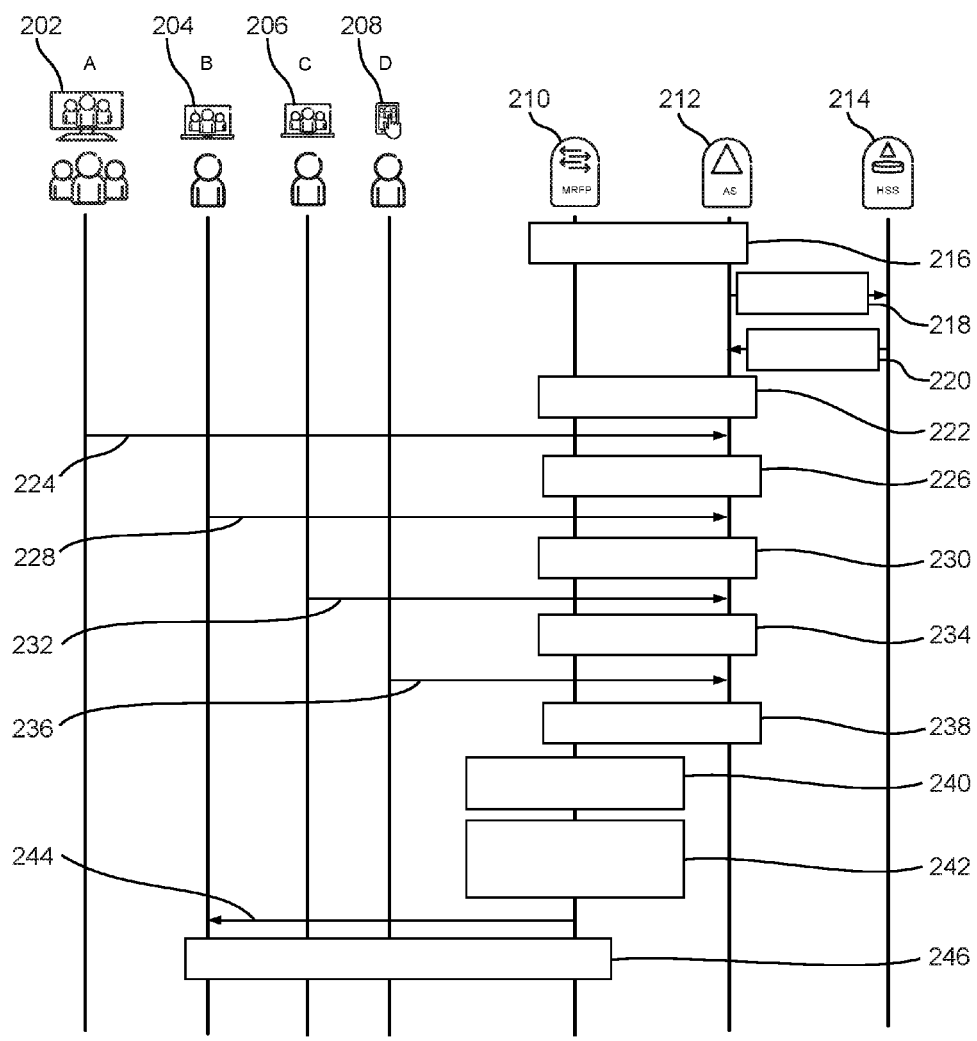
FIG. 2 is a signalling diagram illustrating en example of a method according to embodiments of the present invention for controlling uplink video streams.

FIG. 2 shows an example of a possible flow of events to illustrate the mechanisms of the proposed technology. The Media Resource Function Processor (MRFP) 210 is the video switching server. In this example, the conference is pre-scheduled, and as a part of the scheduling, one of the participants A 202, is configured as prioritized in this specific conference. Another participant D 208 has a premium subscription and is therefore also prioritized. In this example a Home Subscriber Server (HSS) 214 represents the subscriber database and the application used by each participant is controlled via an Applications Server 212.

All participants are given priorities according to the number of persons viewing at each site. In this example it is the participants specifying the number of people viewing. In another example, the number of people viewing could be counted by face recognition in the MRFP 210.

The server continuously measures the activity of the participants and adjusts the priority accordingly.

In a first step 216, a conference is first created by a user via the AS 212 and participant A 202 is configured as prioritized user. This prioritizing is communicated to the MRFP 210. The AS 212 requests 218 the HSS 214 for subscription information of the participants. The HSS 214 transmits 220 subscription information to the AS 212 and the participant priority information is updated 222 at the MRFP 210 with D 208 as prioritized user.

Participant A 202 joins 224 the conference via an application communicating with the AS 212 and specifies the number of persons viewing. The participant priority information is updated 226 at the MRFP 210. Similarly, Participants B 204, C 206, and D 208 join 228, 232, and 236 the conference via applications communicating with the AS 212 and each participant specifies the number of persons viewing. The participant priority information is correspondingly updated 230, 234, and 238 at the MRFP 210. Each participant in the conference typically sends a number of upstream streams in various resolutions, depending on the capabilities of the sending device, the uplink bandwidth available, and the capabilities of the receiving devices.

Participant activity is continuously measured 240 at the MRFP 210 and the participant activity is updated accordingly. Excessive packet loss is detected 242 on the uplink from B 204, e.g. due to reduced available bandwidth. Based on the current priority information, participant C 206 is considered least important from the perspective of B 204. The MRFP then orders 244 B 204 to stop the uplink stream that is received by C 206. The conference continues 246 and C 206 now receives the video from B 204 in a lower resolution, while the uplink stream from B 204 to A 202 and D 206 are unchanged. In other words, the server 210 uses the current priority information and decides that from perspective of B 204, it is best to stop sending the uplink stream dedicated to user C 206. Instead user C 206 gets the same stream from B 204 as is sent to user D 208. This way, the users with higher priority, i.e. users A 202 and D 208, are unaffected by the deteriorated data transport conditions from B 204.

Figure 3A:
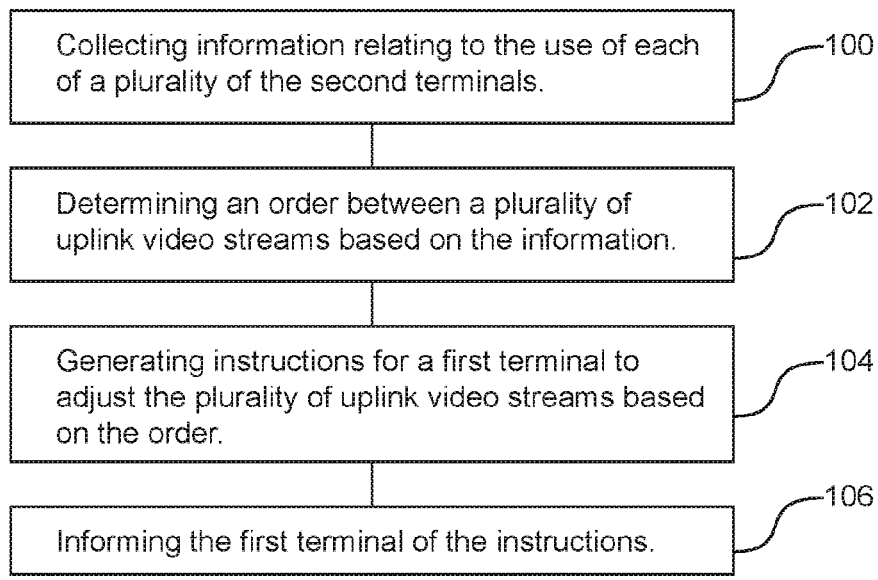
FIGS. 3a-b are flowcharts schematically illustrating a method according to embodiments of the present invention performed in a switching server for controlling uplink video streams.
Figure 5:
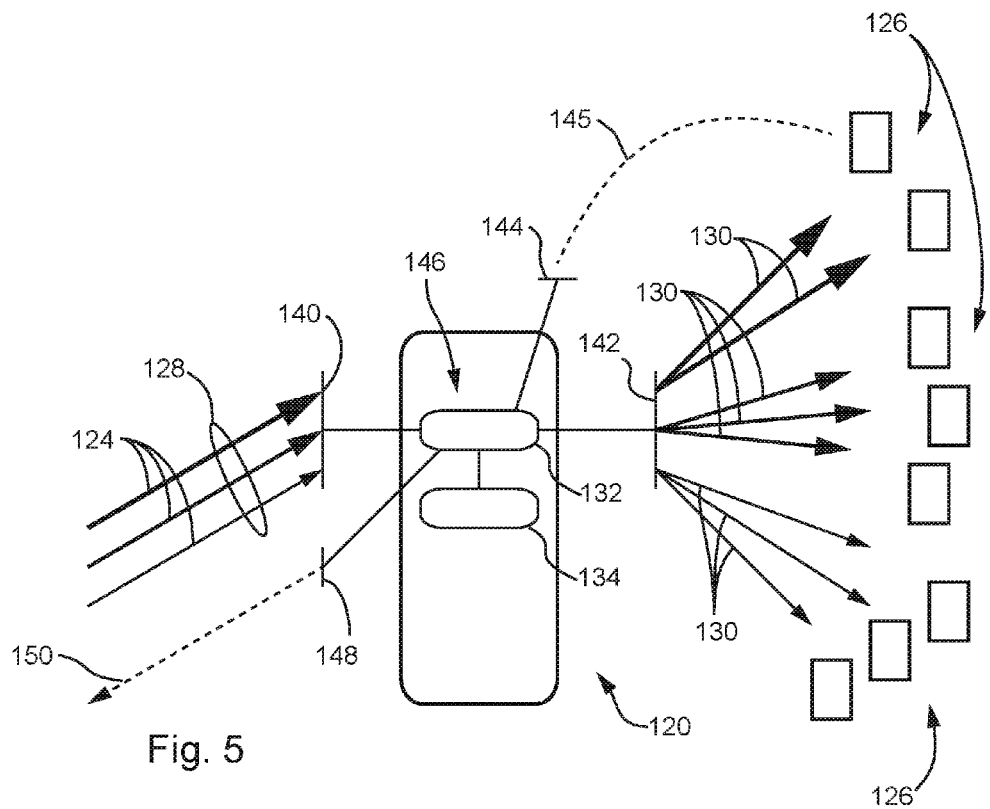
FIG. 5 is a schematic illustration of a switching server according to embodiments of the present invention controlling uplink video streams in a video conference.

FIG. 3*a* is a flowchart schematically illustrating an embodiment of a method performed in a switching server 120, see FIG. 5, for controlling uplink video streams 124 in a video conference connecting a first terminal 122, see FIG.

6, to a plurality of second terminals 126 via the switching server 120. The switching server 120 receives a plurality of uplink video streams 124 from the first terminal 122 via a single transport path 128, and the switching server sends a downlink video stream 130 based on an uplink video stream 124 of the plurality of uplink video streams 124 to each of the second terminals 126. The method comprises:

- 100: Collecting information relating to the use of each of the second terminals 126.
- 102: Determining an order between the plurality of uplink video streams 124 based on the information.
- 104: Generating instructions for the first terminal 122 to adjust the plurality of uplink video streams 124 based on the order.
- 106: Informing the first terminal 122 of the instructions.

Figure 3B:
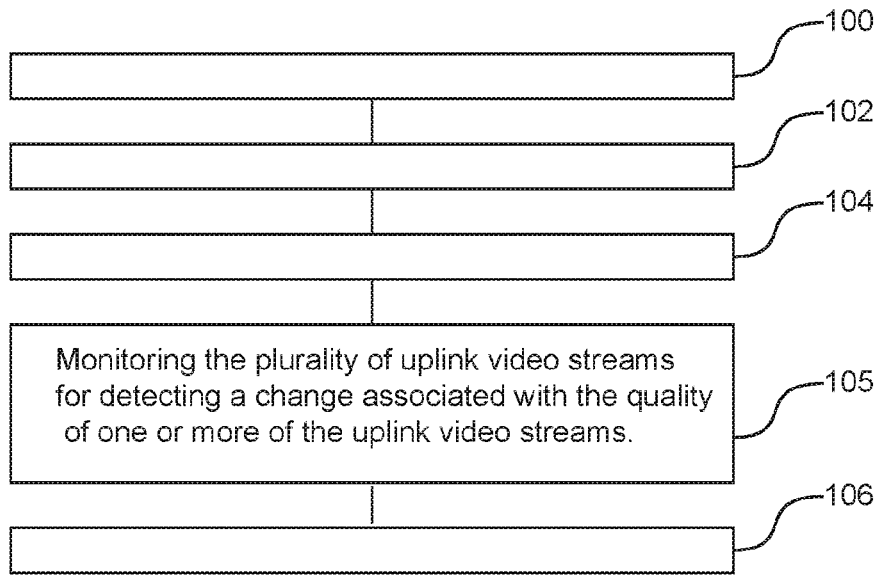

FIG. 3b is a flowchart illustrating an embodiment of the method described in relation to FIG. 3a, in which it further comprises:

- 105: Monitoring the plurality of uplink video streams 124 for detecting a change associated with the quality of one or more of the uplink video streams 124, and the step of informing 106 the first terminal 122 of the instructions is performed subsequent to a detection of a change in the quality. This monitoring is an efficient way of detecting changes in the quality, e.g. due to changes in the bitrate in the transport path. This has the effect that the first terminal 122 can receive the instructions with minimum delay, which allows for a better and more predictable user experience for some of the participants. In one embodiment the change associated with the quality is determined from packet loss and/or media path delays in the plurality of uplink video streams 124.

Figure 4:
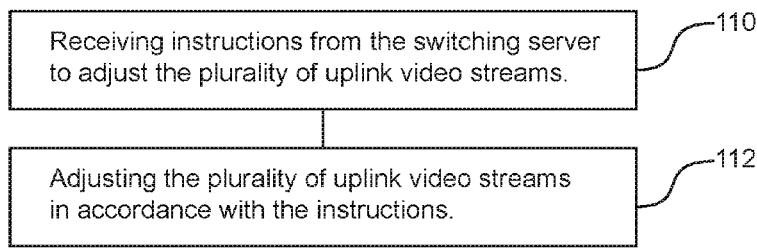
FIG. 4 is a flow chart illustrating a method according to embodiments of the present invention performed in a first terminal for controlling a plurality uplink video streams.
Figure 6:
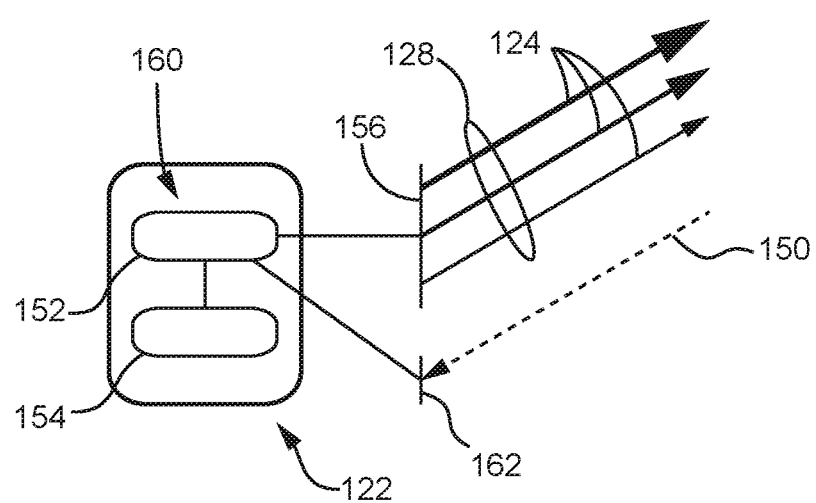
FIG. 6 is a schematic illustration of a first terminal according to embodiments of the present invention controlling uplink video streams in a video conference.

FIG. 4 is a flowchart schematically illustrating an embodiment of a method being performed in a first terminal 122, see FIG. 6, for controlling a plurality of uplink video streams 124 in a video conference connecting the first terminal 122 to a plurality of second terminals 126 via a switching server 120. The first terminal 122 sends a plurality of uplink video streams 124 to the switching server 120 via a single transport path 128. The method comprises:

- 110: Receiving instructions from the switching server 120 to adjust the plurality of uplink video streams 124 based on an order between the plurality of uplink video streams 124 derived from information relating to the use of each of the second terminals 126 collected by the switching server 120.
- 112: Adjusting the plurality of uplink video streams 124 in accordance with the instructions.

FIG. 5 is a schematic illustration of an embodiment of a switching server 120 for controlling uplink video streams in a video conference connecting a first terminal 122, see FIG. 6, to a plurality of second terminals 126 via the switching server 120. The switching server 120 is configured for receiving a plurality of uplink video streams 124 from the first terminal 122 via a single transport path 128 and for sending a downlink video stream 130 based on an uplink video stream 124 of the plurality of uplink video streams 124 to each of the second terminals 126: The switching server 120 is further configured to collect information 100 relating to the use of each of the second terminals 126, and to determine an order 102 between the plurality of uplink video streams 124 based on the information. Additionally, the switching server 120 is configured to generate instructions 104 for the first terminal 122 to adjust the plurality of uplink video streams 124 based on the order, and to inform 106 the first terminal 122 of the instructions.

In an alternative embodiment of the switching server 120, it is further configured to monitor 105 the plurality of uplink video streams 124 for detecting a change associated with the quality of one or more of the uplink video streams 124, and the step of informing 106 the first terminal 122 of the instructions is performed subsequent to a detection of a change in the quality. This embodiment has the same effect as described for the corresponding features in relation to FIG. 3b. In one embodiment the quality may be determined from packet loss and/or media path delays in the plurality of uplink video streams 124.

FIG. 6 is a schematic illustration of an embodiment of a first terminal 122 for controlling a plurality of uplink video streams in a video conference connecting the first terminal 122 to a plurality of second terminals 126 via a switching server 120, see FIG. 5. The first terminal 122 is configured to send the plurality of uplink video streams 124 to the switching server 120 via a single transport path 128, and to receive instructions 110 from the switching server 120 to adjust the plurality of uplink video streams 124 based on an order between the plurality of uplink video streams 124 derived from information relating to the use of each of the second terminals 126 collected by the switching server 120. Additionally, the first terminal 122 is configured to adjust 112 the plurality of uplink video streams 124 in accordance with the instructions.

In the embodiments, the first terminal and the plurality of second terminals may be a smart phone, a tablet computer, a stationary personal computer, or a dedicated video conference solution. Each of the plurality of second terminals 126 may participate in the video conference by sending one or more uplink video streams to the switching server 120. There are also a number of modifications that can be made to the embodiments described above. The modifications, which can be employed alone or in combination with other modifications, are presented below.

The information may comprise an identification of a user of a second terminal 126 of the plurality of second terminals 126. Embodiments with this modification are directed to the criteria II and IIIa discussed above. The information may comprise an identification of a second terminal 126 of the plurality of second terminals 126. With this modification it is possible to give a particular terminal a higher priority, for example a terminal that is permanently installed for being used in video conferences only.

The information may comprise an indication of the number of second terminals 126 receiving an uplink video stream 124 of the plurality of uplink video streams 124. Embodiments with this modification are directed to the criteria I discussed above.

The information may comprise an indication of the number of viewers of a second terminal 126 of the plurality of second terminals 126. Embodiments with this modification essentially correspond to criteria IIIb discussed above. The number of viewers of a second terminal 126 of the plurality of second terminals 126 may be determined by face-recognition in an uplink video stream from the second terminal 126 to the switching server 120. This has the effect that the number of viewers can be updated without any user interaction required, which allows for an easy continuous updating of the priorities.

The information may comprise an indication on how active one or more users of a second terminal 126 are in the video conference. Embodiments with this modification are related to criteria IV discussed above. The indication on how active the one or more users of the second terminal 126 may be determined by voice activity detection in an uplink audio stream from the second terminal to the switching server 120. This allows for an efficient continuous updating of the priorities with respect to the activity level and a better user experience.

The order may represent an arrangement of the second terminals 126 as being above, below, or at the same level in a hierarchy. The instructions may comprise information representing the order. Embodiments with these modifications cover at least in part embodiment B discussed above. Alternatively or additionally, the instructions may comprise orders to adjust the uplink data transfer rate of one or more of the plurality of uplink video streams 124. Embodiments with this modification cover at least in part embodiment A discussed above.

An alternative embodiment to the switching server described in relation to FIG. 5 is a switching server 120 for controlling uplink video streams in a video conference connecting a first terminal 122, see FIG. 6, to a plurality of second terminals 126 via the switching server 120. The switching server 120 is configured for receiving a plurality of uplink video streams from the first terminal 120 via a single transport path 128 and for sending a downlink video stream 130 based on an uplink video stream 124 of the plurality of uplink video streams 124 to each of the second terminals 126. The switching server comprises a processor 132 and a memory 134. The memory 134 contains instructions executable by the processor 132, whereby the switching server 120 is operative to:
- 100: Collect information relating to use of each of the second terminals 126.
- 102: Determine an order between the plurality of uplink video streams 124 based on the information.
- 104: Generate instructions 104 for the first terminal 122 to adjust the plurality of uplink video streams 124 based on the order.
- 106: Inform 106 the first terminal of the instructions.

A yet another alternative embodiment of the switching server described in relation to FIG. 5 is a switching server 120 for controlling uplink video streams in a video conference connecting a first terminal 122, see FIG. 6, to a plurality of second terminals 126 via the switching server 120, the switching server 120 comprising a receiving module 140 configured to receive a plurality of uplink video streams 124 from the first terminal 122 via a single transport path 128. The switching server 120 further comprises a transmitting module 142 configured to send a downlink video stream 130 based on an uplink video stream 124 of the plurality of uplink video streams 124 to each of the second terminals 126. The switching server 120 further comprises a collection module 144 configured to collect information 145 relating to the use of each of the second terminals 126, and a control module 146 configured to determine an order between the plurality of uplink video streams 124 based on the information and to generate instructions for the first terminal 122 to adjust the plurality of uplink video streams 124 based on the order. Additionally, the control module comprises an information unit 148 configured to inform 106 the first terminal 122 of the instructions 150.

An alternative embodiment to the first terminal described in relation to FIG. 6 is a first terminal 122 for controlling a plurality of uplink video streams in a video conference connecting the first terminal 122 to a plurality of second terminals 126 via a switching server 120. The first terminal 122 is configured to send the plurality of uplink video streams 124 to the switching server 120 via a single transport path 128.

The first terminal 122 comprises a processor 152 and a memory 154. The memory 154 contains instructions executable by the processor 152, whereby the first terminal 122 is operative to:
- 110: Receive instructions 150 from the switching server 120 to adjust the plurality of uplink video streams 124 based on an order between the plurality of uplink video streams 124 derived from information relating to the use of each of the second terminals 126 collected by the switching server 120.
- 112: Adjust 112 the plurality of uplink video streams 124 in accordance with the instructions.

A yet another alternative embodiment of the first terminal described in relation to FIG. 6 is a first terminal 122 for controlling a plurality of uplink video streams in a video conference connecting the first terminal 122 to a plurality of second terminals 126 via a switching server 120. The first terminal 122 comprises a transmitting module 156 configured to send the plurality of uplink video streams 124 to the switching server 120 via a single transport path 128, and a receiving module 162 configured to receive instructions 150 from the switching server 120.

The first terminal also comprises a control module 160 configured to adjust the plurality of uplink video streams 124 based on an order between the plurality of uplink video streams 124 in the instructions 150 derived from information relating to the use of each of the second terminals 126 collected by the switching server 120. Additionally, the control module 160 is configured to adjust 112 the plurality of uplink video streams 124 in accordance with the instructions.

The modifications described above are also applicable for these latter four embodiments, both when taken alone or in combination

The invention claimed is:

1. A switching server for controlling uplink video streams in a video conference connecting a first terminal to a plurality of second terminals via the switching server, the switching server being configured for receiving a plurality of uplink video streams from the first terminal via a single transport path and for sending a downlink video stream based on an uplink video stream of the plurality of uplink video streams to each of the second terminals, the switching server further being configured to:
   collect information relating to the use of each of the second terminals, wherein collecting the information further comprises: (i) transmitting a request to a Home Subscriber Server (HSS) for subscription information regarding each of the second terminals and (ii) receiving the subscription information from the HSS;
   determine an order between the plurality of uplink video streams based on the information;
   generate instructions for the first terminal to adjust the plurality of uplink video streams based on the order; and
   inform the first terminal of the instructions.

2. The switching server according to claim 1, wherein the switching server is further configured to:
   monitor the plurality of uplink video streams for detecting a change associated with the quality of one or more of the uplink video streams,
   and the step of informing the first terminal of the instructions is performed subsequent to a detection of a change in the quality.

3. The switching server according to claim 2, wherein the change associated with the quality is determined from packet loss and/or media path delays in the plurality of uplink video streams.

4. The switching server according to claim 1, wherein the information comprises an identification of a user of a second terminal of the plurality of second terminals.

5. The switching server according to claim 1, wherein the information comprises an identification of a second terminal of the plurality of second terminals.

6. The switching server according to claim 1, wherein the information comprises an indication of the number of second terminals receiving an uplink video stream of the plurality of uplink video streams.

7. The switching server according to claim 1, wherein the information comprises an indication of the number of viewers of a second terminal of the plurality of second terminals.

8. The switching server according to claim 7, wherein the number of viewers of a second terminal of the plurality of second terminals is determined by face-recognition in an uplink video stream from the second terminal to the switching server.

9. The switching server according to claim 1, wherein the information comprises an indication on how active one or more users of a second terminal are in the video conference.

10. The switching server according to claim 9, wherein the indication on how active the one or more users of the second terminal are is determined by voice activity detection in an uplink audio stream from the second terminal to the switching server.

11. A first terminal for controlling a plurality of uplink video streams in a video conference connecting the first terminal to a plurality of second terminals via a switching server, the first terminal being configured to:
send the plurality of uplink video streams to the switching server via a single transport path;
receive instructions from the switching server to adjust the plurality of uplink video streams based on an order between the plurality of uplink video streams derived from information relating to the use of each of the second terminals collected by the switching server, wherein the information comprises subscription information regarding each of the second terminals received from a Home Subscriber Server (HSS); and
adjust the plurality of uplink video streams in accordance with the instructions.

12. The first terminal according to claim 11, wherein the information comprises an identification of a user of a second terminal of the plurality of second terminals.

13. The first terminal according to claim 11, wherein the information comprises an identification of a second terminal of the plurality of second terminals.

14. The first terminal according to claim 11, wherein the information comprises an indication of the number of second terminals receiving an uplink video stream of the plurality of uplink video streams.

15. The first terminal according to claim 11, wherein the information comprises an indication of the number of viewers of a second terminal of the plurality of second terminals.

16. The first terminal according to claim 11, wherein the information comprises an indication on how active one or more users of a second terminal are in the video conference.

17. The first terminal according to claim 11, wherein the order represents an arrangement of the second terminals as being above, below, or at the same level in a hierarchy.

18. The first terminal according to claim 11, wherein the instructions comprises information representing the order.

19. The first terminal according to claim 11, wherein the instructions comprises orders to adjust the uplink data transfer rate of one or more of the plurality of uplink video streams.

20. A switching server for controlling uplink video streams in a video conference connecting a first terminal to a plurality of second terminals via the switching server, the switching server being configured for receiving a plurality of uplink video streams from the first terminal via a single transport path and for sending a downlink video stream based on an uplink video stream of the plurality of uplink video streams to each of the second terminals, wherein the switching server comprises a processor and a memory, the memory containing instructions executable by the processor whereby the switching server is operative to:
collect information relating to use of each of the second terminals, wherein collecting the information further comprises: (i) transmit a request to a Home Subscriber Server (HSS) for subscription information regarding each of the second terminals and (ii) receive the subscription information from the HSS;
determine an order between the plurality of uplink video streams based on the information;
generate instructions for the first terminal to adjust the plurality of uplink video streams based on the order; and
inform the first terminal of the instructions.

* * * * *